United States Patent [19]

Kluksdahl

[11] 3,764,557

[45] Oct. 9, 1973

[54] CATALYST ACTIVATION PROCESS AND ACTIVATED CATALYST

[75] Inventor: Harris E. Kluksdahl, San Rafael, Calif.

[73] Assignee: Chevron Research Company, San Francisco, Calif.

[22] Filed: Jan. 11, 1971

[21] Appl. No.: 105,461

Related U.S. Application Data

[63] Continuation-in-part of Ser. No. 28,807, April 15, 1970, abandoned, which is a continuation-in-part of Ser. Nos. 7,061, Jan. 30, 1970, abandoned, and Ser. No. 8,663, Feb. 4, 1970, which is a continuation-in-part of Ser. No. 865,010, Oct. 9, 1969, abandoned.

[52] U.S. Cl................. 252/415, 208/138, 208/139, 252/441, 252/442, 252/439
[51] Int. Cl................................................ B01j 11/14
[58] Field of Search............................ 208/138, 139; 252/415, 416, 441, 442, 466 PT

[56] References Cited
UNITED STATES PATENTS

| | | | |
|---|---|---|---|
| 3,511,888 | 5/1970 | Jenkins | 208/138 X |
| 2,906,702 | 9/1959 | Brennan et al. | 208/140 |
| 2,914,460 | 11/1959 | Kimberlin et al. | 208/138 X |
| 3,134,732 | 5/1964 | Kearby et al. | 252/415 X |
| 3,243,384 | 3/1966 | Raarup | 252/415 |
| 3,558,479 | 1/1971 | Jacobson et al. | 252/415 |
| 2,479,110 | 8/1949 | Haensel | 208/139 |
| 2,940,924 | 6/1960 | Brennan et al. | 208/138 |
| 3,058,907 | 10/1962 | Van Nordstrand et al. | 208/139 X |
| 3,173,857 | 3/1965 | Haensel | 208/139 |
| 3,296,119 | 1/1967 | Bicek | 208/139 |
| 3,415,737 | 12/1968 | Kluksdahl | 252/466 PT |
| 3,449,237 | 1/1969 | Jacobson et al. | 252/466 PT |
| 3,574,091 | 4/1971 | Hayes | 208/138 |
| 3,617,519 | 11/1971 | Hayes | 208/139 |
| 3,236,761 | 2/1966 | Rabo et al. | 208/138 X |

Primary Examiner—Patrick P. Garvin
Attorney—George F. Magdenburger, Roy H. Davies, J. A. Buchanan, Jr. and T. G. DeJonghe

[57] ABSTRACT

A process for activating a catalytic composition including a porous inorganic oxide carrier, a platinum group component and a tin component, comprising: reacting the catalytic composition with an activating gas including oxygen at a temperature within the range from about 500°F. to about 1300°F. for at least about 0.5 hour. The activating gas preferably includes a halogenating component. The activating gas is preferably slightly moist and is preferably flowed through the catalytic composition. The catalytic composition may comprise a fresh catalytic composition, a regenerated catalytic composition, or a mixture thereof. A preferred activated catalytic composition comprises an alumina carrier, 0.01 to 3 weight percent platinum, 0.01 to 8 weight percent tin, and 0.01 to 3 weight percent halide. It may also contain 0.01 to 3 weight percent rhenium. Another preferred activated catalytic composition comprises an alumina carrier, 0.01 to 3 weight percent platinum, 0.01 to 5 weight percent tin, 0.001 to 1 weight percent iridium and 0.01 to 3 weight percent halide. Also covers the resulting activated catalytic compositions.

8 Claims, 6 Drawing Figures

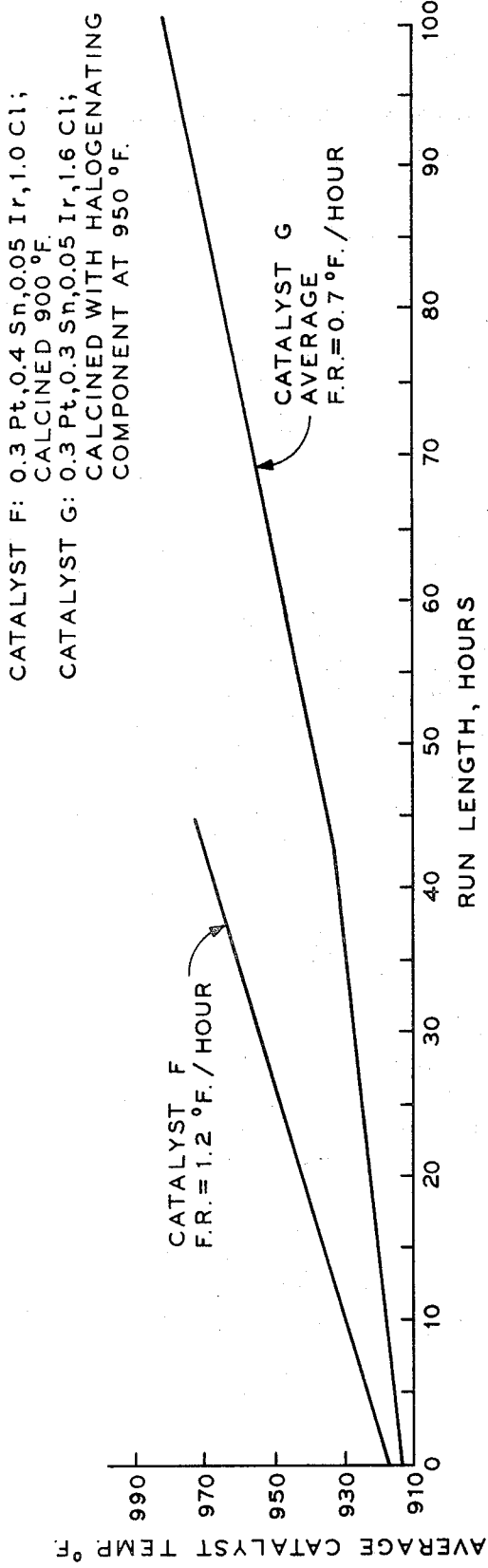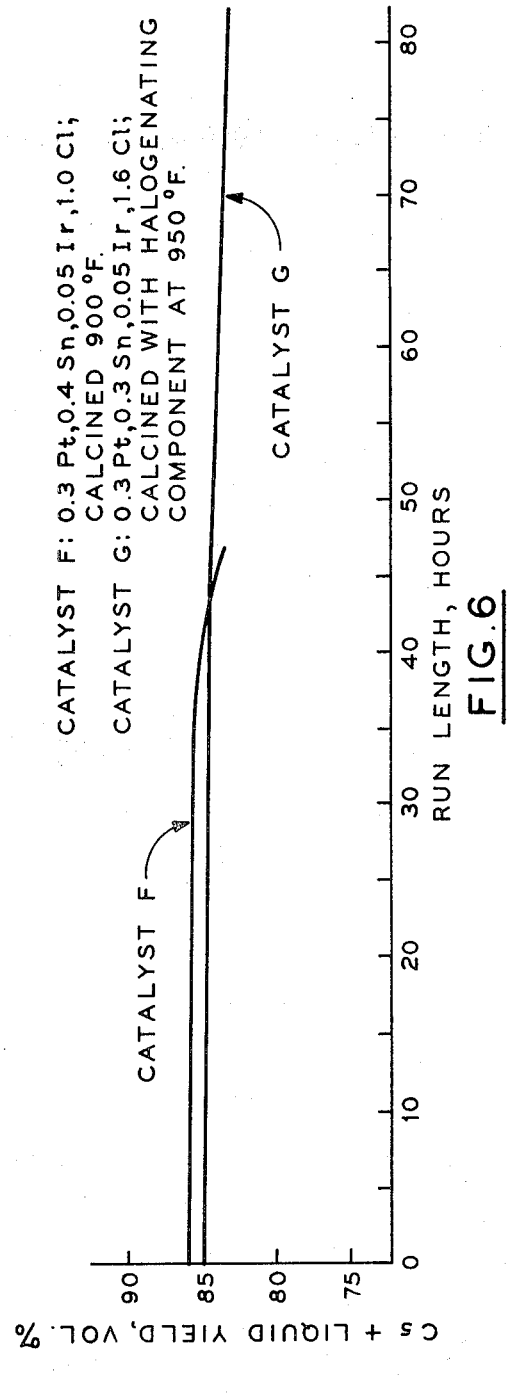

CATALYST ACTIVATION PROCESS AND ACTIVATED CATALYST

CROSS REFERENCE

This application is a continuation-in-part of copending application Ser. No. 28,807, filed Apr. 15, 1970, now abandoned, which is in turn a continuation-in-part of copending applications, Ser. No. 7,061, filed Jan. 30, 1070, now abandoned in favor of continuation application Ser. No. 263,574, filed June 16, 1972; and Ser. No. 8,663, filed Feb. 4, 1970. Ser. No. 8,663, filed Feb. 4, 1970, is in turn a continuation-in-part of copending application Ser. No. 865,010, filed Oct. 9, 1969, now abandoned.

BACKGROUND

This inventon is concerned with an activated catalytic composition and a process for activating the catalytic composition. The process disclosed is advantageously employed with a fresh catalytic composition, a regenerated catalytic composition, or a mixture thereof.

In my copending applications Ser. No. 865,010, filed Oct. 9, 1969, now abandoned and Ser. No. 8,663, filed Feb. 4, 1970, I have disclosed and claimed a unique and useful catalytic composition including a platinum group component, a tin component, and a porous solid carrier. In copending application Ser. No. 13,044, filed Feb. 20, 1970, I, along with W. C. Buss, have disclosed and claimed a unique and useful catalytic composition including a platinum component, an iridium component, a tin component, and a porous solid carrier. In copending application Ser. No. 7,061, filed Jan. 30, 1970, I have disclosed and claimed a unique and useful catalytic composition including a platinum group component, a tin component, a rhenium component, and a porous solid carrier. The disclosure in these applications is herein incorporated by reference. The catalytic compositions are useful in hydrocarbon hydroconversion processes and, more particularly, in reforming processes. I also disclosed and claimed in the above recited applications processes for the hydroconversion of hydrocarbons in the presence of these catalytic compositions and processes for producing the compositions.

I have discovered that the disclosed catalytic compositions, when the tin component is included therewith by impregnation from an aqueous solution or when the disclosed catalytic compositions have been contacted with substantial moisture after inclusion of a tin component therewith by any procedure, are improved markedly by being activated as described herein. I have further discovered that the activation procedure described herein is very useful in activating the disclosed catalytic compositions after they have been deactivated as, for example, by use in a hydrocarbon hydroconversion process, such as a reforming process, and then regenerated to remove coke deposits and the like.

The prior art discloses rejuvenating deactivated platinum-containing catalysts by treating them with an oxygen-containing gas at elevated temperature. The prior art also reveals in U.S. Pat. Nos. 2,960,702 and 3,117,076, to Brennan et al, and U.S. Pat. No. 2,916,440 to Hogin et al, reacting platinum containing catalysts with a halogen or halogen affording substance and oxygen. The prior art is, however, not concerned with the necessity for activating a catalytic composition including a platinum group component, a tin component, and a porous inorganic oxide carrier to develop its full catalytic activity. Further, the prior art is not aware of the necessity for activating a catalytic composition including a platinum group component, a tin component, and a porous inorganic oxide carrier after regeneration thereof when said catalytic composition has become deactivated and coked by use in a hydrocarbon conversion process.

SUMMARY OF THE INVENTION

In accordance with the present invention, a process for activating a catalytic composition including a porous inorganic oxide carrier, a platinum group component, and a tin component is disclosed comprising reacting the catalytic composition with an activating gas including oxygen at a temperature within the range from about 500°F. to about 1,300°F. for at least about 0.5 hour to calcine it. The activating gas can preferably be slightly moist and is preferably flowed through the catalyst during the activating. The activating gas may preferably include a halogenating component. The activating process may be advantageously applied to fresh catalyst, regenerated catalyst, and mixtures thereof.

Also disclosed is an activated catalytic composition comprising a porous inorganic oxide, a platinum group component, and a tin component, the catalytic composition having been activated by reaction with an activating gas including oxygen at a temperature from 500°F. to 1,300°F. The activating procedure yields a novel catalyst composition which has a lower fouling rate and better yield stability than a non-activated catalytic composition having the same amounts of the same components.

DESCRIPTION OF THE DRAWINGS

The present invention can be better understood and will be further explained hereinafter with reference to the graphs in FIGS. 1–6 which compare in simulated life tests platinum-tin catalysts which have been activated by the method of the present invention and platinum-tin catalysts which have not been activated.

FIG. 1 also illustrates that a platinum-tin catalyst that is activated using a halogenating component as a component of the activating gas has a lower fouling rate than a platinum-tin catalyst activated without using a halogenating component.

FIG. 2 also illustrates that the yield stability of a platinum-tin catalyst that has been activated using a halogenating component as a component of the activating gas is superior to the yield stability of a platinum-tin catalyst that has been activated without using a halogenating component.

FIG. 5 illustrates that the fouling rate of a platinum-tin-iridium catalyst that has been activated using a halogenating component as a component of the activating gas is lower than the fouling rate of a platinum-tin-iridium catalyst that has been activated in a dry flowing air without using a halogenating component.

FIG. 6 illustrates that the yield stability of a platinum-tin-iridium catalyst activated using a halogenating component as a component of the activating gas is better than the yield stability of a platinum-tin-iridium catalyst activated in dry flowing air without using a halogenating component.

DETAILED DESCRIPTION OF THE INVENTION

The Catalytic Composition

Figure 1:
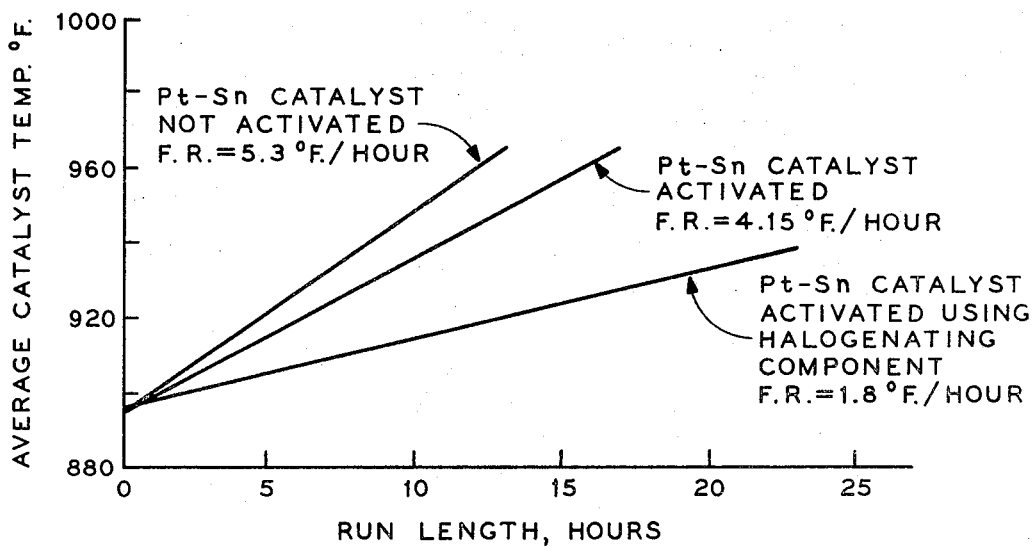
FIG. 1 illustrates that an activated platinum-tin catalyst has a lower fouling rate than a platinum-tin catalyst that is not activated.

The catalytic composition that can be advantageously activated by the process of the present invention includes a porous inorganic oxide carrier, 0.01 to 3 weight percent of a platinum group component, and 0.01 to 8 weight percent of a tin component. It may also include 0.01 to 3 weight percent of a rhenium component. Preferably, it also includes 0.1 to 3 weight percent halide.

The porous inorganic oxide carrier or support that is employed in the preparation of the catalytic composition of the present invention can be any of a large number of materials with which catalytically active amounts of a platinum group component and a tin component and, in particular embodiments, a rhenium component can be associated. A high surface area inorganic oxide carrier is particularly preferred. For example, an inorganic oxide having a surface area of greater than 50 $m^2/gm$, preferably greater than about 150 $m^2/gm$. Generally, the porous inorganic oxides that are useful for the present invention have surface areas from about 50 $m^2/gm$ to 750 $m^2/gm$. Natural or synthetically produced inorganic oxides or combinations thereof can be used. Typical specific inorganic oxides include the naturally occurring aluminum silicates and the synthetically produced cracking supports such as silica-alumina, silica-zirconia, silica-alumina-zirconia, silica-magnesia, silica-alumina-magnesia and crystalline zeolitic alumino silicates.

For reforming processes, it is generally preferred that the catalyst has low cracking activity, that is, has limited acidity. It is preferred for reforming processes to use inorganic oxide carriers, such as magnesia and alumina. Alumina is particularly preferred for purposes of this invention. Any of the forms of alumina suitable as a support for reforming catalysts can be used, for example, gamma-alumina, eta-alumina, etc. Gamma-alumina is particularly preferred. Furthermore, alumina can be prepared by a variety of methods satisfactory for the purposes of this invention.

For hydrocracking processes, it is generally preferred that the porous inorganic oxide carrier comprises a siliceous oxide. Generally, preferred hydrocracking catalysts contain silica-alumina, particularly silica-alumina having a silica content in the range of 30 to 99 weight percent.

The term "platinum group component" as used herein includes platinum, palladium, rhodium, ruthenium, osmium, and iridium. Regardless of the form in which the platinum group component, tin component, and rhenium component, exist on the carrier, whether as metal or compound, e.g., halide, oxide, sulfide, etc., the weight percent is calculated as metal. Reference to "platinum," "platinum group component," "tin," etc. is thus meant to refer to both the metal and the compound form.

Many different methods of preparation can be used for including the platinum group component and tin component with the porous inorganic oxide carrier. The platinum group component and tin component can be included with the carrier in intimate admixture with each other by suitable techniques as ion exchange, coprecipitation, impregnation and the like. The metal components are generally included with the carrier by impregnation, either sequentially or simultaneously. The metal components are desirably uniformly disposed upon the surface of the carrier.

In general, the carrier material is impregnated with a solution of a compound of the metal in sufficient concentrations to provide the desired quantity of metal component in the finished catalyst. Tin is suitably included on the carrier by impregnation with aqueous or nonaqueous solutions of stannic chloride. Other tin salts, for example, other tin halides, sulfides, hydroxides and the like, and organic tin compounds, among others, can also be used.

The catalytic composition may also include a rhenium component. To include rhenium with the catalyst by impregnation, perrhenic acid in an aqueous solution is preferred. Other suitable rhenium compounds can be used, for example, ammonium or potassium perrhenates. A catalytic composition comprising a platinum group component, a tin component, a rhenium component and a porous inorganic oxide carrier is preferably activated as described herein to develop its full catalytic potential, when the tin component is included with the catalytic composition by impregnation from an aqueous solution and/or when the catalytic composition is contacted with moisture after tin has been included therewith.

The preferred platinum group component includes 0.01 to three weight percent platinum and may also include 0.001 to 1 weight percent iridium. To incorporate platinum on the catalyst by impregnation, chloroplatinic acid in an aqueous solution is preferred. Other platinum-containing compounds can be used, for example, chloroplatinates and polyammine platinum salts. Iridium compounds suitable for including with the carrier include, among others, chloroiridic acid, iridium tribromide, ammonium chloroiridate, iridium trichloride, and ammonium bromoiridate.

Preferably, the catalyst is promoted for hydrocarbon hydroconversion reactions by the addition of combined halogen (halides), particularly fluorine or chlorine. Bromine may also be used. The catalyst promoted with halogen usually contains from 0.1 to 10 weight percent, preferably 0.1 to three weight percent total halogen content. The halogens may be included with the catalyst at any suitable stage of catalyst manufacture, e.g., prior to or following including of the platinum group component and tin component. Generally, the halogens can be combined with the catalyst by contacting suitable compounds such as hydrogen fluoride, ammonium fluoride, hydrogen chloride, and ammonium chloride, either in the gaseous form or in the water soluble form with the catalyst. Preferably, the fluorine or chlorine is included with the catalyst from an aqueous solution containing the halogen. Often halogen is included with the catalyst by impregnating with a solution of a halogen compound of a platinum group metal, tin, or rhenium. Thus, for example, impregnation with chloroplatinic acid normally results in chlorine addition to the catalyst. It is preferred that at least a portion of the halogen content of the catalyst is included with the catalyst during the activation process disclosed herein.

The novel catalytic composition of the present invention finds utility for various hydrocarbon hydroconversion reactions including hydrofining, hydrogenation, reforming, alkylation, dehydrocyclization, isomerization, and hydrocracking. It is most advantageously used in reforming.

Following association of the porous inorganic oxide carrier wth the platinum group component and tin component, and, preferably, also following association with at least a portion of the halogen component the resulting composition is usually treated by heating at a temperature of, for example, no greater than 500°F. and preferably at 200°F.–400°F. to partially dehydrate it. Thereafter, the composition can be activated by calcining it at an elevated temperature, preferably in the range from 500°F. to 1,300°F. as described in more detail below. In the case of sequential deposition of the metal components onto the porous inorganic oxide carrier, it may be desirable to dry and calcine the catalyst after the introduction of one of the metal components and prior to the introduction of another.

The tin component, as mentioned above, can be included with the porous inorganic oxide carried suitably by impregnation. Impregnation can be accomplished using an aqueous solution of a suitable tin compound or an organic, preferably substantially anhydrous, solution of a tin compound. Impregnation from an aqueous solution is most convenient, since then it is possible to impregnate a tin component along with a platinum group component and, if desired, a rhenium component in a single impregnating step. If an aqueous impregnation is used to include the tin component with the catalytic composition that also includes a platinum group component, the resulting platinum group-tin-porous inorganic oxide carrier catalytic composition does not exhibit equal activity to an otherwise identical catalytic composition that has been prepared by impregnating the tin component from a substantially anhydrous organic solvent. Similarly, if a tin component is included with the catalytic composition by impregnating with an organic, substantially anhydrous solution, and subsequently the tin impregnated catalytic composition is contacted with substantial moisture, the resulting catalytic composition, even if dried, does not exhibit equal activity to an otherwise identical catalytic composition that has not been contacted with substantial moisture. In fact, the catalytic composition prepared by aqueous impregnation of a tin component, or anhydrous impregnation followed by contact with substantial moisture, may in some instances be no more active than a catalytic composition containing the same amount of platinum but without a tin component.

ACTIVATION PROCESS

The activation process described herein is useful for activating a catalytic composition including a platinum group component, a tin component, and a porous inorganic oxide carrier. It is especially useful when the tin component has been included with the carrier by impregnation from an aqueous solution. It is also particularly useful for activating a catalytic composition including a platinum group component, a tin component and a porous inorganic oxide carrier that has become deactivated through use in a hydrocarbon conversion process and, more specifically, in a reforming process, and regenerated by reaction with an oxygen-containing gas having less than about two percent oxygen to remove the coke that has accumulated on the catalytic composition in the reforming process. This holds whether the tin component is originally included with the catalytic composition by impregnation from an aqueous solution, impregnation from a substantially anhydrous organic solution, or any other method.

It is essential, if a low fouling rate is to be maintained after a number of regenerations, that said catalytic composition be activated after regeneration at least after every third regeneration, more preferably at least after every second regeneration, and most preferably after each regeneration.

The activation process comprises reacting a catalytic composition including a porous inorganic oxide carrier, a platinum group component, and a tin component with an activating gas that includes oxygen at a temperature within the range from about 500°F. to about 1,300°F. for at least about 0.5 hour. The activating gas is preferably slightly moist. The activating gas is preferably flowed through the catalyst. The activating gas may preferably include a halogenating component to adjust and/or maintain the halogen content of the catalyst. Halogen analysis of the catalyst can be used to determine if a halogenating component should be present in the activating gas. It is generally very preferable to include the halogenating component when the activation process is being performed on a catalyst that has become deactivated through use in a hydrocarbon conversion process and then regenerated. This is because some halogen is generally removed from the deactivated catalyst during use in the hydrocarbon conversion process.

The oxygen preferably comprises at least about 0.1 percent of the activating gas and, more preferably, from about 0.5 percent to about 40 percent of the activating gas.

The halogenating component, when such is included with the activating gas, is any component that, at a temperature within the range from about 500°F. to about 1,300°F., reacts with the catalytic composition to increase the halogen content of the catalytic composition. Usable halogenating components include, but are not limited to, carbon tetrachloride, chloroform, hydrogen chloride, hydrogen fluoride, t-butyl chloride, t-butyl fluoride, trifluorochloromethane, chlorine, fluorine, trichloroethylene, dichlorodifluoromethane, isobutylfluoride, ethylchloride, and the like. Sufficient halogenating component is used to provide any desired halogen content in the finished catalytic composition. It is desirable to include at least a portion of the halogen during activation; preferably at least about five percent of the total halogen included with the catalyst.

The non-oxygen, non-halogenating component portion of the activating gas can include any component that does not deleteriously affect the catalytic composition or its reaction with the oxygen and the halogenating component if such is included therewith. The preferred activating gas comprises mixtures of air and a halogenating component with up to about 99.8 parts by weight nitrogen or other inert gas.

It is preferred that the activating gas is slightly moist. The presence of moisture aids in equally distributing halogen throughout the catalytic composition. It is convenient to saturate the activating gas, at about room temperature, with moisture, as, for example, by bubbling the gas through a reservoir that contains water. The amount of moisture in the activating gas is not critical, although it will affect somewhat the rate of distribution of the halogen. Generally, the partial pressure of moisture in the activating gas should be at least about 0.05 psia during the activating process.

The reacting of the catalytic composition with the activating gas is performed at a temperature within the range from about 500°F. to about 1,300°F. Preferably, the reacting is performed at a temperature within the range from about 700°F. to about 1,050°F. When these temperatures are maintained during the reacting, the catalytic composition is markedly improved in activity.

The reacting of the activating gas with the catalytic composition should continue for at least about 0.5 hour. Preferably, the reacting continues for from about 0.5 hour to about 48 hours, more preferably, for from about 0.5 hour to about eight hours. Reacting for less than about 0.5 hour does not generally lead to substantially complete activation of the catalytic composition. Reacting for longer times than 48 hours will not substantially improve the activity of the catalytic composition.

Preferably, the activating gas is flowed through the catalyst which may, for example, be disposed in a bed of catalyst particles, more preferably, the activating gas is circulated, i.e., repeatedly flowed in a circular path, through a bed of catalyst. When a halogenating component is included with the activating gas, it may be added during only a portion of the activation process. It is important, when the activating gas includes a halogenating component as well as oxygen, to flow the activating gas. The flowing helps to substantially equally distribute the halogen throughout the catalyst composition.

Following activation as described above, it is preferred that the resulting calcined catalytic composition is contacted with a substantially hydrocarbon-free hydrogen containing gas at a temperature from about 600°F. to about 1,300°F. and, preferably, from about 600°F. to 1000°F. to reduce it. A substantially moisture-free hydrogen containing gas is preferred. It is preferred that the substantially hydrocarbon-free hydrogen containing gas is also substantially free of carbon oxides. Hydrocarbon, carbon oxides, and moisture will deleteriously affect the hydrogen treatment.

Utility

The process of the present invention is useful in activating catalytic compositions including a platinum group component, a tin component, and a porous inorganic oxide carrier. The activated catalytic composition produced by the activation process of the present invention is useful in hydrocarbon conversion applications. Specifically, it is useful in reforming hydrocarbons to form high-octane gasoline usable in internal combustion engines and the like.

The present invention will be better understood with reference to the following illustrative examples.

EXAMPLE 1

Catalysts A, B, and C were each individually used in reforming a hydrofined, catalytically cracked naphtha under accelerated conditions. Catalyst A comprised 0.3 weight percent platinum, 0.4 weight percent tin, and 1.2 weight percent chlorine. Catalyst A was not calcined. It had been dried in air at a temperature of 250°F. for 16 hours. Catalyst B comprised 0.3 weight percent platinum, 0.4 weight percent tin, and 1.2 weight percent chlorine. Catalyst B was activated by heating at 950°F. for about four hours with an activating gas comprising five percent oxygen and the remainder nitrogen. The pressure during activating was 160 psig. The activating gas was continually flowed through the catalyst during the activating. Catalyst C comprised 0.3 weight percent platinum, 0.4 weight percent tin, and 1.3 weight percent chlorine. Catalyst C was activated with an activating gas comprising five percent oxygen, about 0.3 percent moisture, a halogenating component and the remainder nitrogen at 950°F. The pressure during activating was 160 psig. The halogenating component was added over about a 15 minute period at the beginning of the activating. The activating continued for about four hours. A portion of the chlorine in Catalyst C was introduced during the activating. The activating gas was continually flowed through the catalyst during the activating. Each catalyst was reduced in pure hydrogen prior to use.

The reforming processes were conducted at reforming conditions including an average reactor pressure of 125 psig, a hydrogen to hydrocarbon mole ratio of 3 and a liquid hourly space velocity of 3. The temperature of the catalyst, in the process using each catalyst, was adjusted throughout each run to maintain production of a 100 F-1 clear octane product. The runs were made using once-through hydrogen. The hydrofined, catalytically cracked naphtha had an initial boiling point of 151°F., an end boiling point of 428°F., and a 50 percent boiling point of 307°F. The research octane number of the feed without antiknock additives (F-1 clear) was 64.6. The naphtha contained less than 0.1 ppm nitrogen and less than 0.1 ppm sulfur. The feed was specifically chosen because of its severe deactivating effect on reforming catalysts. Using this feed and the above reaction conditions, tests of reforming catalysts are accelerated, i.e., performed in a fraction of the time needed with a less severely deactivating feed and under less severe conditions.

Figure 2:
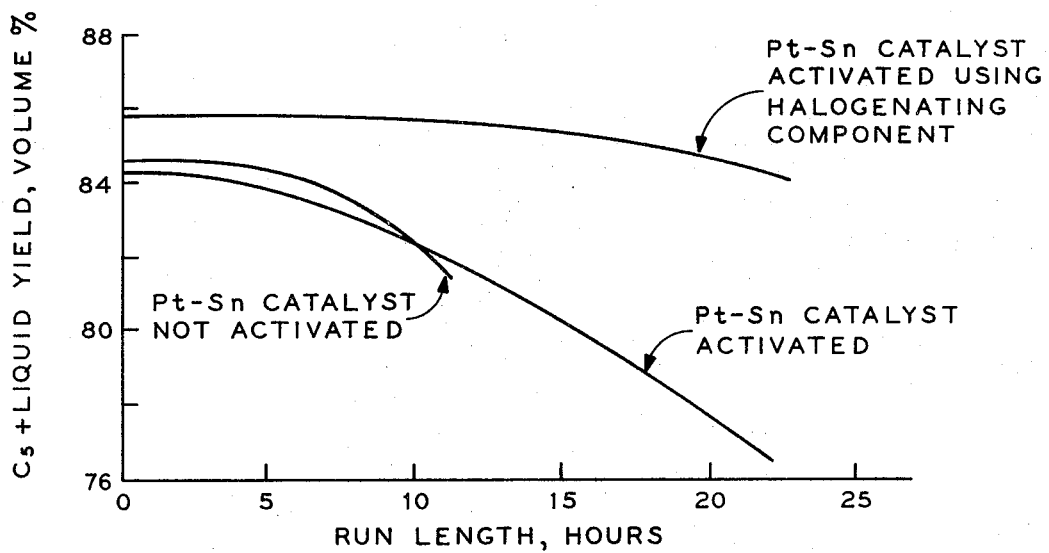
FIG. 2 illustrates that the yield stability of an activated platinum-tin catalyst is superior to that of a platinum-tin catalyst that has not been activated.

The results of reforming the naphtha at the accelerated conditions specified using Catalysts A, B, and C, are shown in FIGS. 1 and 2. The graph in FIG. 1 shows the average catalyst temperature in °F. as a function of the run-length in hours. The graph in FIG. 2 shows the $C_5+$ liquid yield in volume percent as a function of the run-length in hours.

The platinum-tin catalyst activated using a halogenating component (Catalyst C) had a significantly lower fouling rate than the platinum-tin catalyst activated without using a halogenating component (Catalyst B), which, in turn, had a lower fouling rate than a platinum-tin catalyst that was not activated (Catalyst A).

The platinum-tin catalyst activated using a halogenating component (Catalyst C) exhibited far better yield stability than a platinum-tin catalyst activated without using a halogenating component (Catalyst B)

which, in turn, had better yield stability than a platinum-tin catalyst that has not been activated (Catalyst A).

EXAMPLE 2

Catalysts D and E were each individually used in reforming tests identical to those described in Example 1. Catalyst D comprised 0.24 weight percent platinum, 0.4 weight percent tin, 0.1 weight percent rhenium and 0.85 weight percent chlorine. Catalyst D was activated at 950°F. for about four hours using an activating gas comprising five percent oxygen and the remainder nitrogen. The activating gas was not flowed through the catalyst during the activating. Catalyst E comprised 0.24 weight percent platinum, 0.4 weight percent tin, 0.1 weight percent rhenium and 1.4 weight percent chlorine. Catalyst E was activated at 950°F. for about four hours using an activating gas comprising 5 percent oxygen, about 0.3 percent moisture, a halogenating component, and the remainder nitrogen. The pressure during activating was 160 psig. The halogenating component was added over about a 15 minute period at the beginning of the activating. A portion of the chlorine in Catalyst E was introduced during the activating. The activating gas was continually flowed through the catalyst during the activating. Each catalyst was reduced in pure hydrogen at 950°F. prior to use.

Figure 3:
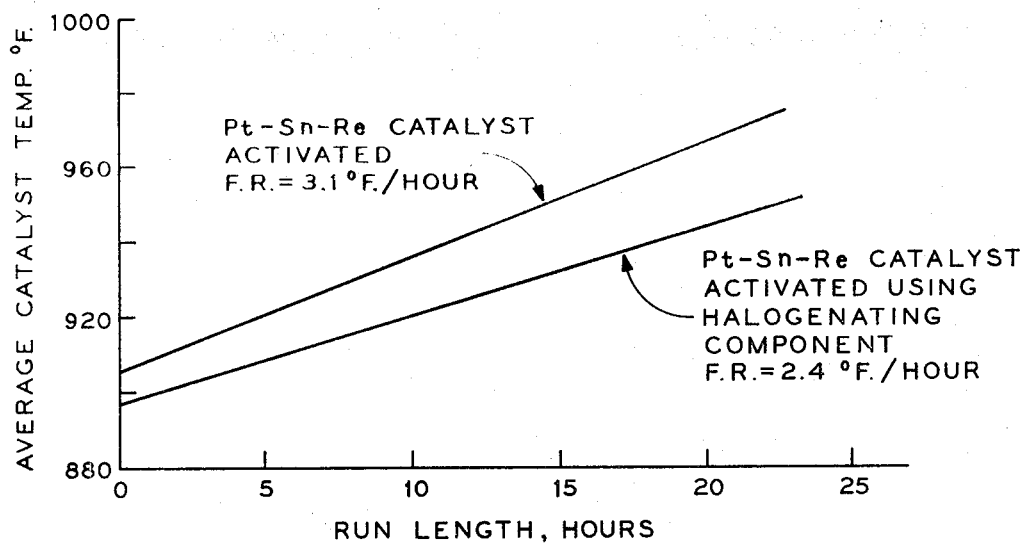
FIG. 3 illustrates that the fouling rate of a platinum-tin-rhenium catalyst that has been activated using a halogenating component as a component of the activating gas is lower than the fouling rate of a platinum-tin-rhenium catalyst that has been activated in a dry and substantially static oxygen containing atmosphere without using a halogenating component.
Figure 4:
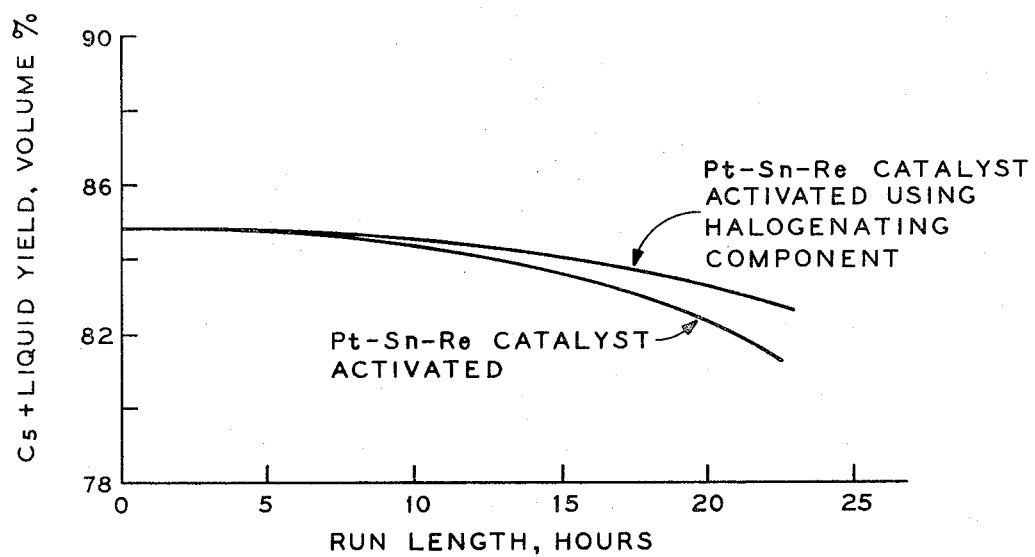
FIG. 4 illustrates that the yield stability of a platinum-tin-rhenium catalyst activated using a halogenating component as a component of the activating gas is better than the yield stability of a platinum-tin-rhenim catalyst activated in a dry and substantially static oxygen containing atmosphere without using a halogenating component.

The results of reforming the naphtha at the accelerated conditions specified using Catalysts D and E are shown in FIGS. 3 and 4. The graph in FIG. 3 shows the average catalyst temperature in °F. as a function of the run-length in hours. The graph in FIG. 4 shows the $C_5+$ liquid yield in volume percent as a function of the run-length in hours.

The platinum-tin-rhenium catalyst activated using a halogenating component as a component of the activating gas (Catalyst E) had a significantly lower fouling rate than the platinum-tin-rhenium catalyst activated without using a halogenating component and without flowing the activating gas (Catalyst D). The platinum-tin-rhenium catalyst activated using a halogenating component as a component of the activating gas (Catalyst E) also exhibited better yield stability than the platinum-tin-rhenium catalyst activated without using a halogenating component (Catalyst D).

EXAMPLE 3

Catalysts F and G were each individually used in reforming a hydrofined catalytically cracked naphtha under accelerated reforming conditions. Catalyst F comprised 0.3 weight percent platinum, 0.4 weight percent tin, 0.05 weight percent iridium and 1.0 weight percent chlorine. It had been activated by calcining in dry flowing air at a pressure of about 15 psia and a temperature of 900°F. for about four hours. The chlorine had been added by impregnation prior to calcining. Catalyst G comprised 0.3 weight percent platinum, 0.3 weight percent tin, 0.05 weight percent iridium and 1.6 weight percent chlorine. It had been calcined and activated in the presence of a halogenating component at 950°F. The pressure during activating was 160 psig. The halogenating component was added over about a 15 minute period at the beginning of the activating. The activating continued for about four hours. The activating gas had about 0.3 percent moisture. The activating gas was constantly flowed through the catalyst during the activating. A portion of the 1.6 weight percent chlorine was introduced in this manner. The activating of Catalyst G was performed in the presence of about five weight percent oxygen.

The reforming processes were conducted at reforming conditions, including an average reactor pressure of 160 psig, a hydrogen to hydrocarbon mole ratio of 4 and a liquid hourly space velocity of 4. The temperature of the catalyst in the process using each catalyst was adjusted throughout each run to maintain production of 99 F-1 clear octane product. The runs were made using once-through hydrogen. Each catalyst was reduced in pure hydrogen at about 920°F. prior to use. The hydrofined catalytically cracked naphtha was the same as that described in Example 1. Using this feed and the above reaction conditions, the tests of reforming catalysts are accelerated, i.e., performed in a fraction of the time needed with a less severely deactivating feed and under less severe conditions.

The results of reforming the naphtha at the above specified accelerated conditions using Catalysts F and G are shown in FIGS. 5 and 6. The graph in FIG. 5 shows the average catalyst temperature in degrees Farenheit as a function of the run length in hours. The graph in FIG. 6 shows the $C_5+$ liquid yield in volume percent as a function of the run length in hours.

The platinum-tin-iridium catalyst activated using a halogenating component as a component of the activating gas (Catalyst G) had a significantly lower fouling rate than the platinum-tin-iridium catalyst activated without using a halogenating component (Catalyst F). The platinum-tin-iridium catalyst activated using a halogenating component as a component of the activating gas (Catalyst G) also exhibited high yield for a longer period of time than the platinum-tin-irridium catalyst activated without using a halogenating component (Catalyst F).

EXAMPLE 4

This example illustrates the necessity for activating a regenerated platinum-tin catalytic composition to maintain a low fouling rate.

Catalysts H, I, and J were each individually used in reforming the same naphtha as was used in Example 1 under accelerated reforming conditions, including a pressure of 125 psig, a liquid hourly space velocity of 3.0, and a hydrogen-to-hydrocarbon mole ratio of 3.0 to produce a 100 F-1 clear octane product.

Catalyst H comprised 0.3 weight percent platinum, 0.4 weight percent tin, and 1.08 weight percent chlorine associated with alumina. It had been activated by being calcining in an activating gas consisting of one percent oxygen in nitrogen gas for four hours at a temperature of 950°F. and a pressure of 160 psig. The water partial pressure in the activating gas was 0.48 psia. A portion, about 0.5 weight percent based on the catalyst, of the chlorine was added to Catalyst H during the activation. The chlorine was added as chloroform.

Catalyst I comprised a portion of Catalyst H which had been used in a pilot plant reforming operation and then regenerated. The platinum and tin contents of Catalyst I were thus the same as those of Catalyst H. The chlorine content of Catalyst I was 0.96 weight percent.

Catalyst J comprised a portion of Catalyst I which had been activated. The platinum and tin contents of Catalyst J were thus the same as those of Catalysts H and I. The chlorine content of Catalyst J was about 1.2 weight percent. Catalyst J was activated in precisely the same manner as Catalyst H was activated.

The table below shows the measured fouling rates for equal size samples of the three catalysts:

| Catalyst | Fouling Rate, °F/Hour |
|---|---|
| H | 1.6 |
| I | 2.3 |
| J | 1.75 |

Clearly, activation after regeneration is essential if a low fouling rate is to be maintained after regeneration.

While the invention has been described in connection with specific embodiments thereof, it will be understood that it is capable of further modification and this application is intended to cover any variations, uses, or adaptations of the invention, following, in general, the principles of the invention, and including such departures from the present disclosure as come within known or customary practice in the art to which the invention pertains, and as may be applied to the essential features hereinbefore set forth, and as fall within the scope of the invention and the limits of the appended claims.

The invention is hereby claimed as follows:

1. A process for regenerating and reactivating a catalytic composition which has become deactivated by use in catalytic reforming wherein the catalytic composition comprises from about 0.01 to about 3 weight percent platinum in the form of platinum, platinum oxide or platinum sulfide, and from about 0.01 to about 8 weight percent tin in the form of tin, tin oxide or tin sulfide and a porous alumina carrier, and 0.1 to 3.0 weight percent halide, which process comprises contacting the catalytic composition with an activating gas comprising oxygen and a halogenating component selected from the group consisting of halogenated hydrocarbons, hydrogen halides and halogens at a temperature between 500° to 1300°F for a time sufficient to activate the catalytic composition.

2. A process in accordance with claim 1 wherein the catalytic composition is contacted with a gas comprising oxygen at a temperature between 500° and 1300°F. prior to contacting the catalytic composition with said activating gas, to thereby regenerate the catalytic composition prior to contacting the catalytic composition with said activating gas.

3. A process in accordance with claim 1 wherein the catalytic composition consists essentially of platinum, platinum oxide, or platinum sulfide and tin, tin oxide, or tin sulfide and a porous alumina carrier, and 0.3 to 3.0 weight percent halide and wherein said process consists essentially of contacting the catalytic composition with oxygen at a temperature between 500° and 1300°F. and then contacting the catalytic composition with oxygen and a halogenating component at a temperature between 500° and 1300°F. for a time sufficient to activate the catalytic composition.

4. A process in accordance with claim 1, wherein the platinum or platinum compound includes platinum in an amount from 0.01 to 3 weight percent, and the tin or tin compound is in an amount from about 0.01 to 8 weight percent.

5. A process in accordance with claim 4, wherein the catalytic composition includes 0.01 to 3 weight percent rhenium.

6. A process in accordance with claim 4, wherein the catalytic composition includes iridium in an amount from 0.001 to 1 weight percent.

7. A process in accordance with claim 1, wherein the activating gas is slightly moist.

8. A process in accordance with claim 1, wherein the activating gas is flowed through the catalytic composition.

* * * * *